Nov. 24, 1970    R. FIEGLER    3,541,677
TOOL REPLACING DEVICE FOR MACHINE TOOLS HAVING A WORKING SPINDLE
AND MOVABLE IN THREE COORDINATED AXES
Filed Feb. 27, 1968    4 Sheets-Sheet 1

INVENTOR
RICHARD FIEGLER

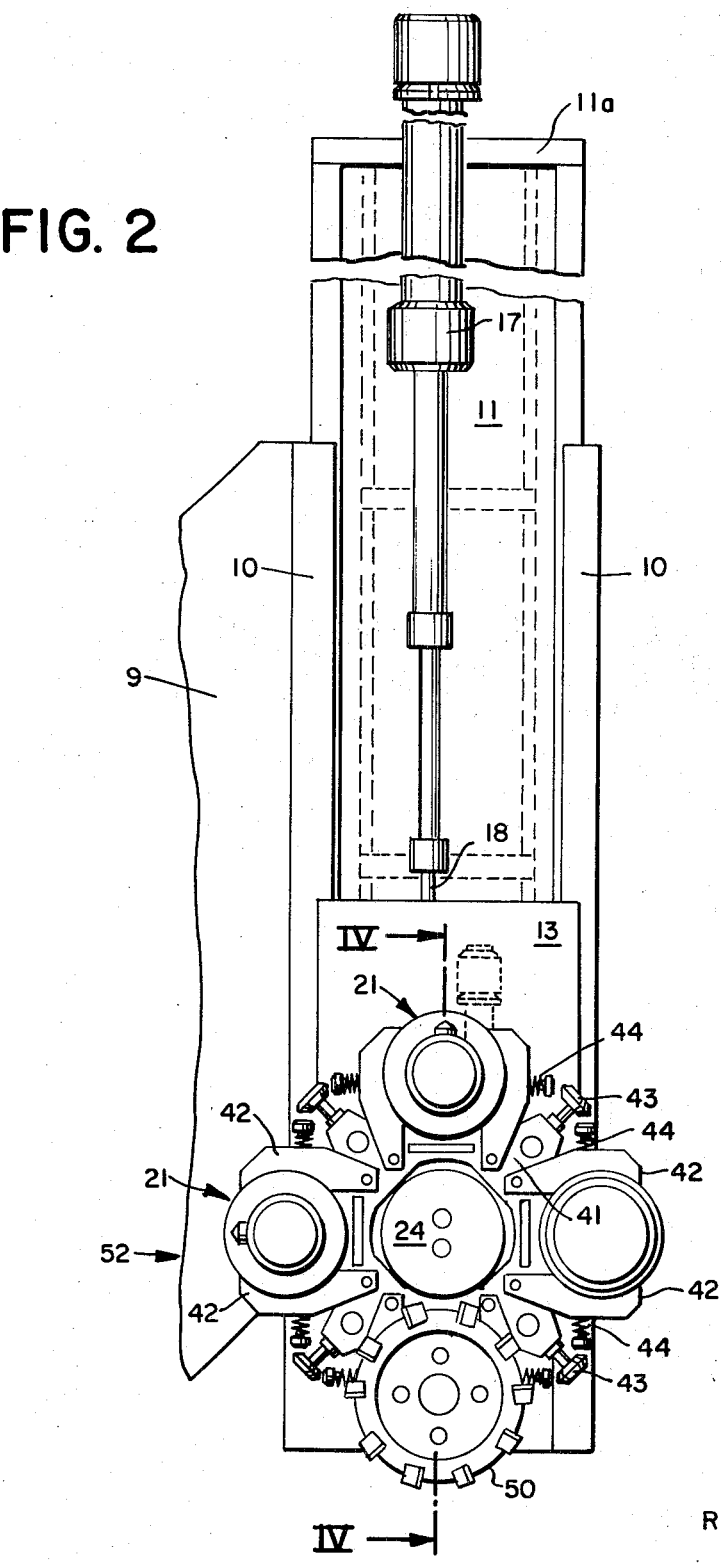

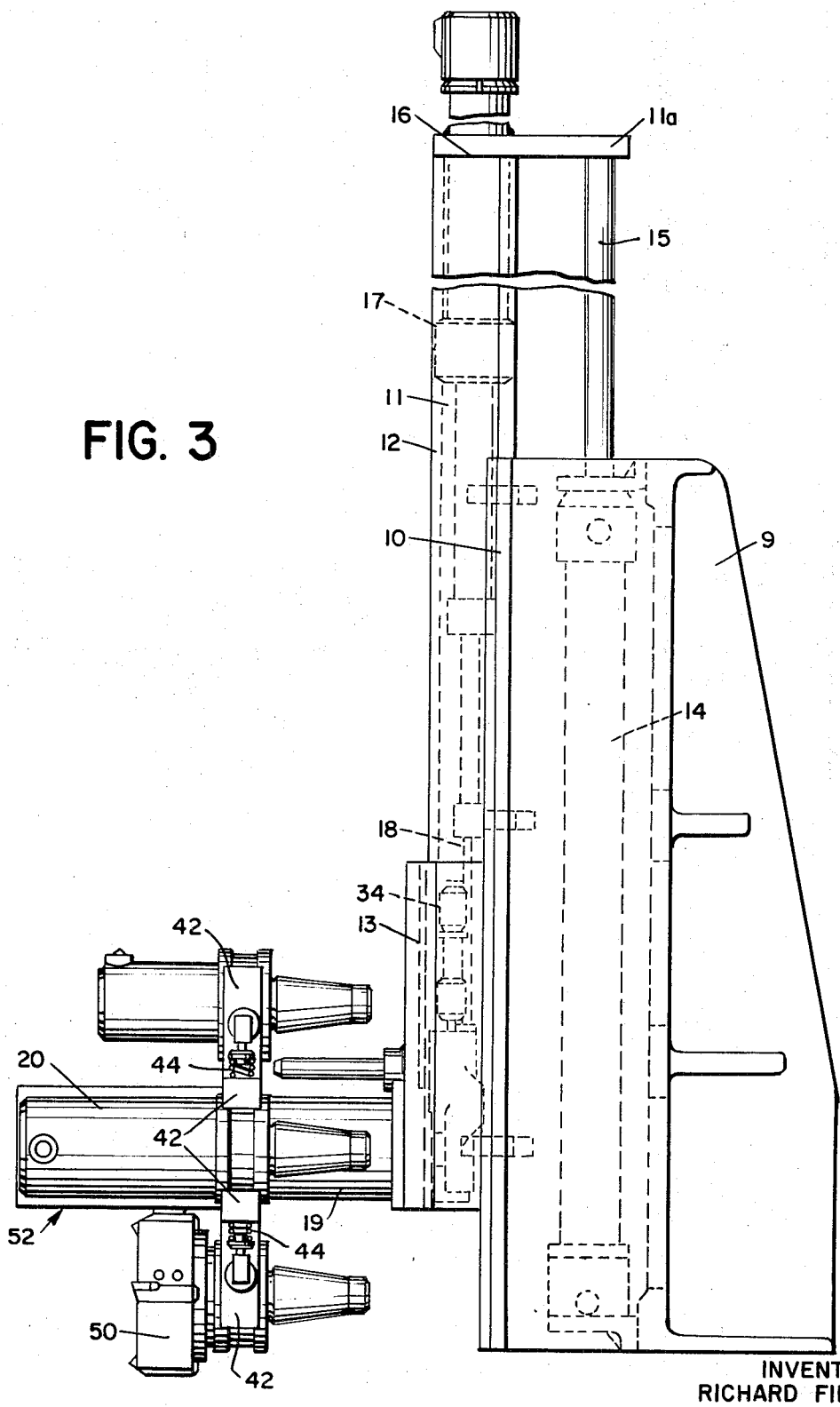

Nov. 24, 1970 R. FIEGLER 3,541,677
TOOL REPLACING DEVICE FOR MACHINE TOOLS HAVING A WORKING SPINDLE
AND MOVABLE IN THREE COORDINATED AXES
Filed Feb. 27, 1968 4 Sheets-Sheet 4

INVENTOR
RICHARD FIEGLER

United States Patent Office 3,541,677
Patented Nov. 24, 1970

3,541,677
TOOL REPLACING DEVICE FOR MACHINE TOOLS HAVING A WORKING SPINDLE AND MOVABLE IN THREE COORDINATED AXES
Richard Fiegler, Karl-Marx-Stadt, Germany, assignor to Institut für Werkzeugmaschinen, Karl-Marx-Stadt, Germany
Filed Feb. 27, 1968, Ser. No. 708,704
Int. Cl. B23q 3/157
U.S. Cl. 29—568                      10 Claims

ABSTRACT OF THE DISCLOSURE

A tool storage chain is guided in parallel with and above the longest path of movement of the working spindle of a programmed machine tool. A telescopic guide, which is slidably supported on the machine tool between the storage chain and the working spindle carries a rotatable multi-arm gripping head controlled by a number of hydraulic piston drives to carry out the tool replacing motions. The position of the storage chain is controlled by a hydraulic tracing device which is attached to the machine tool and is arranged in slidable contact with the chain.

BACKGROUND OF THE INVENTION

This invention relates in general to an automatic machine tool and in particular to a tool changing device for a machine tool having its working spindle movable along three coordinate axes.

From the prior art, there are known program controlled machine tools wherein the tool replacement is automatically carried out during the programmed course. In the known machine tools, the working spindle is movable in two coordinate axes only, and the movement in a third coordinate axis is accomplished by means of a chucking table. It is also known to provide in the known machine tools a tool storage device in the form of an endless chain which is separated from the spindle support member and runs in parallel to the perpendicular path of motion thereof.

The tool gripping mechanism, as well as the chain tracing device, also take part in the movement of the spindle supporting member, so that they move parallel to the storage chain. As a consequence of this parallel movement it is possible to create a coupling between the storage chain and the working spindle support member. Moreover, due to the separation of the storage chain from the spindle support member, the former may be of any desired length and, therefore, an increased number of tools may be suspended thereupon. Since the tool gripping mechanism and the chain tracing device participate in the movement of the spindle support member, the position of the point of transfer remains constant with respect to the working spindle and, as a result, the time needed for the tool replacement is reduced.

This known solution is advantageous for machine tools having the working spindle movable along two axes but disadvantageous for machine tools wherein the working spindle is to be moved in three coordinate directions. The reason for this is that the storage chain must have participated also on the horizontal movement of the spindle-stock support so that the bed of the machine would become greatly overloaded and the accuracy of the machine tool would be doubtful. A construction of a second bed would result in an intolerably increased cost, as well as the overloading of the drive gears. To avoid the above mentioned shortcomings, in machine tools with three coordinate movements of the working spindle, a tool replacing device has been developed having a stationary storage member from which the tools are transferred to the working spindle by means of a gripping mechanism which is slidably supported on a guideway. At one end position of the guideway the gripping mechanism withdraws the tool from the storage member and, at the other end, it installs the tool on the working spindle. In the design of a machine tool of this type, it is necessary to locate the storage member at a certain distance from the machine tool in order to maintain a sufficient operational area of the tool. Besides, the slideway, upon which the transfer device is moving, must have a length corresponding to that of the horizontal movement of the working spindle which is usually greater than its vertical movement. Moreover, to safeguard the tool transfer, the spindle supporting member must always be positioned against a definite point.

It is, therefore, the primary object of this invention to provide an improved tool replacing device for a machine tool having a working spindle which is movable in three coordinate axes.

Another object of this invention is to eliminate the positioning of the spindle support member before the tool replacement.

A further object of this invention is to provide a tool storage member having an increased capacity.

A still further object of this invention is to provide an improved tool transfer device between the tool storage member and the working spindle.

SUMMARY OF THE INVENTION

According to the present invention the above objects are attained so that a tool storing chain is guided parallel with and above the longest path of the horizontal movement of the working spindle, supported on a separate frame, and driven by a separate drive means. A tool transfer device is slidably supported on a vertical telescopic guideway which is attached to the spindlestock above the working spindle. The tool transfer device includes a multi-arm gripping turret head which is controlled by hydraulic thrust piston drives to transpose the tools, between the storing chain and the working spindle, on the line of intersection between the perpendicular planes thereof. A tracing control unit is attached on top of the machine tool for controlling the position of the storing chain in dependence on position of the working spindle. The telescopic guideway is provided on a bracket which is firmly attached to the slide carriage upon which the spindle is supported for a horizontal movement.

In case of machine tools having the working spindle adapted for movement in only two directions, the guideway is attached directly to the spindlestock support member which is movable in a vertical direction. The telescopic guideway supports a W-shaped vertical ribbed guide upon which a second slide carriage is slidably mounted for movement in a vertical direction, the second slide carriage supporting the gripping turret head. Between the telescopic ribbed guide and the first and second slide carriages thrust piston drives are respectively joined. The gripping turret head comprises a telescopic tubular slide member consisting of an inner tubular piece attached at one end to the second slide carriage, and of an outer tubular piece slidably and rotatably enclosing the free end of the inner tubular piece. A number of spring grippers are arranged circumferentially on the outer tubular piece to form either a two-arm lever or a four-arm cross turret head for manipulating the tools to be changed. A planetary gear assembly including a central gear is fixedly mounted on a bearing bolt which is integral with the front crosspiece of the outer tubular piece, and a cage journalled to the bearing bolt and secured against rotation with respect to the inner tubular piece by means of slide bolts. A planet gear is journalled to the cage and is in engagement with said central gear, and a grooved shaft integral at one end with said planet gear and at the other end is in engagement with a grooved hollow shaft, the hollow shaft being pivotably secured to the second slide carriage and terminated with a pinion.

A piston drive is disposed within the second slide carriage and is in engagement with the pinion for transmitting rotational movement to the planet gear and thereby to the outer tubular piece. A further piston drive is disposed within said telescopic tubular member and jointed between the inner and outer tubular pieces to produce an axial movement of the outer tubular piece. Each of the spring grippers consists of a pair of pivotably mounted gripping jaws provided with springs for abutment on buffers disposed at an angle of 45° between respective grippers on the outer tubular piece. The position control unit is a hydraulic tracing device having a tracing finger in a slidable contact with the storing chain to control hydraulic drive means of the latter in dependence on the program of the machine tool and on the position of the working spindle.

The invention will be more fully understood with reference to the following detailed description, when considered with the accompanying drawings.

BRIEF DESCRIPTION OF THE DRAWING

FIG. 2 is a front view of a transfer device of the machine of FIG. 1;

FIG. 3 is a side elevation of the transfer device of FIG. 2;

DESCRIPTION OF A PREFERRED EMBODIMENT

Figure 1:
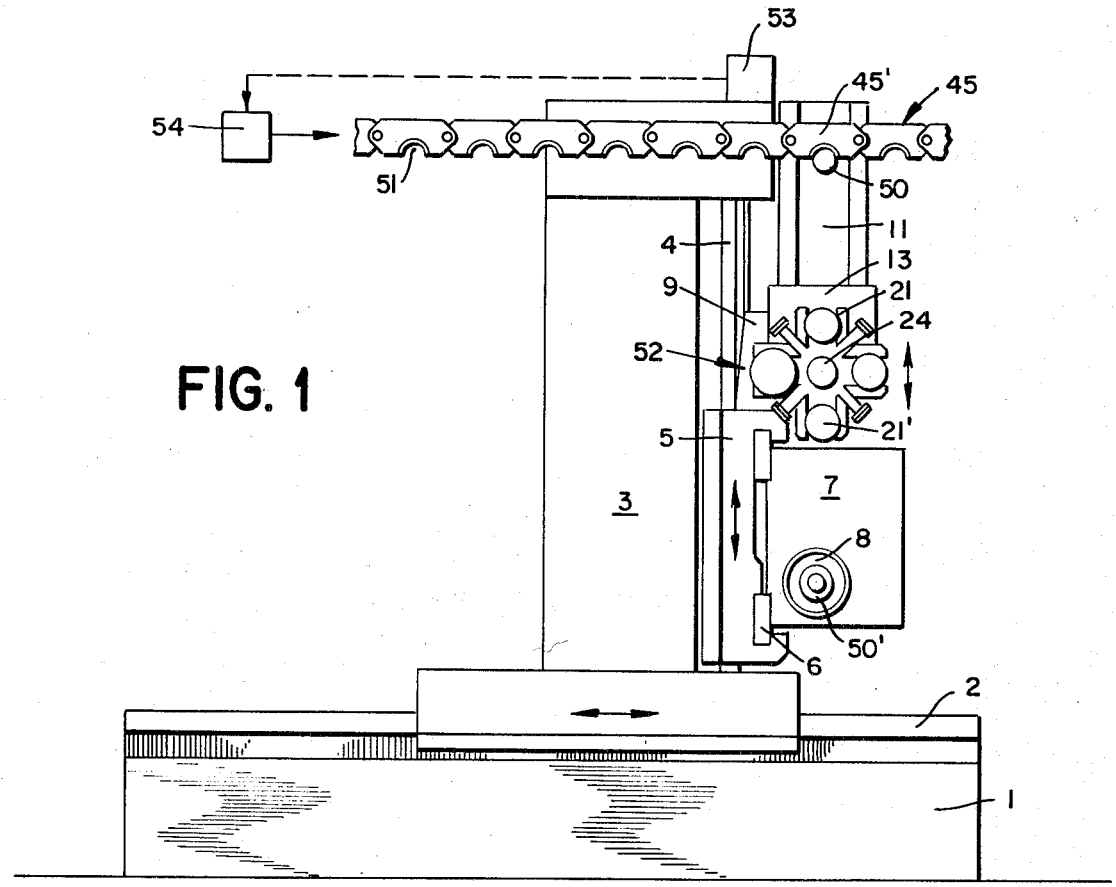
FIG. 1 is a schematic side elevation of a machine tool with a spindle movable in three coordinate axes.

In FIG. 1, a machine tool is shown standing on a bed 1 which is stationarily affixed to the foundation. The upper portion of the bed 1 is provided with a horizontal guide way 2 on which a base or column 3 is slidably supported. A perpendicular slideway 4 is arranged at one side of the column 3 for guiding a slide carriage 5. The slide carriage 5 is provided on its surface, away from the column 3, with horizontal guideway 6 upon which a spindlestock 7 having a horizontal working spindle 8 is slidably supported. A bracket 9 having two vertical guide grooves 10 (as shown in FIG. 3) is attached on the top of the slide carriage 5 for slidably supporting in said grooves 10 a telescopic ribbed guide 11 of a W-shaped cross-section. The ribbed guide 11 may, of course, have another cross-section, in dependence on the working conditions. As shown in FIG. 3, the ribbed guide 11 is provided on its front side with a slideway 12 which supports for a vertical movement a second slide carriage 13 carrying the tool gripping turret head 52.

Figure 5:
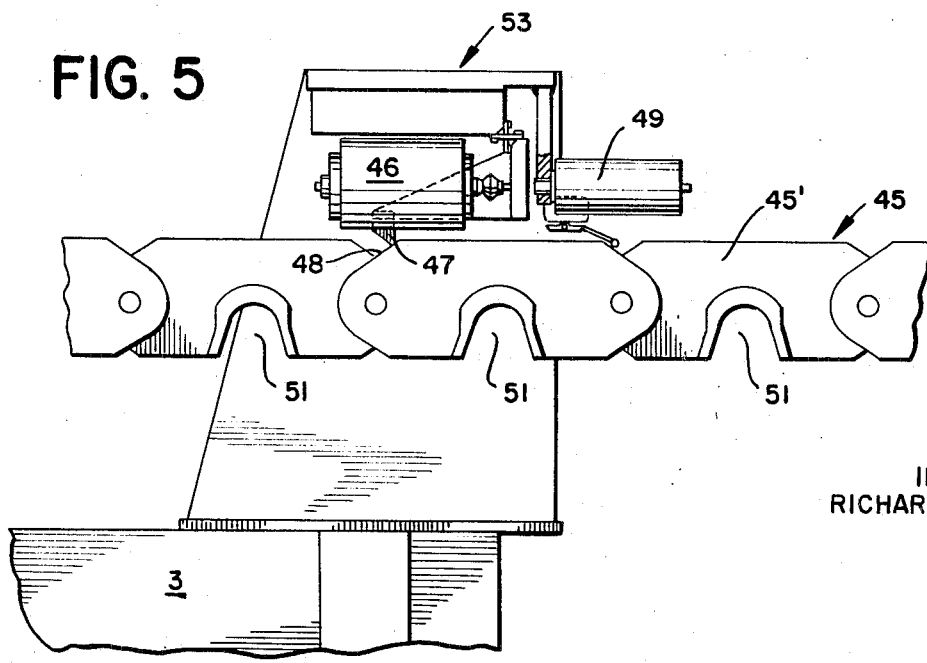
FIG. 5 is a partial side view on the top end of the column of the machine with a tracing and control mechanism.

A tool storage chain 45 is guided near to the top portion of the column 3. The chain 45 is supported on a separate structure (not shown in the drawing) which may be either fixedly fastened to the foundation or suspended in a known manner on a special supporting beam by means of sprocket wheels which are driven for instance by hydraulically controlled drive means 54. The path of the movement of the tool storage chain 45 is directed in parallel with the guideway 2 of the bed 1 and the chain 45 is situated approximately in the perpendicular plane of the side surface of the slide carriage 5. According to the required storage capacity, the chain 45 may have a linear, curved or multilooped form. It is in no direct contact with the column 3 except through a hydraulic tracing device 53 (see FIG. 5), which is fastened to the column 3 whereby a tracing figure 47 follows the sloping edges 48 of individual chain elements 45'. The tracing device 53 is carried out as a hydraulic square slide valve distributing system 46 having conduits (not shown) connected with hydraulic chain drive 54 to control the movement of the latter and thereby to position the chain 45. The tracing finger 47 is pivotably arranged in order to be controlled by an electomagnet 49.

Figure 4:
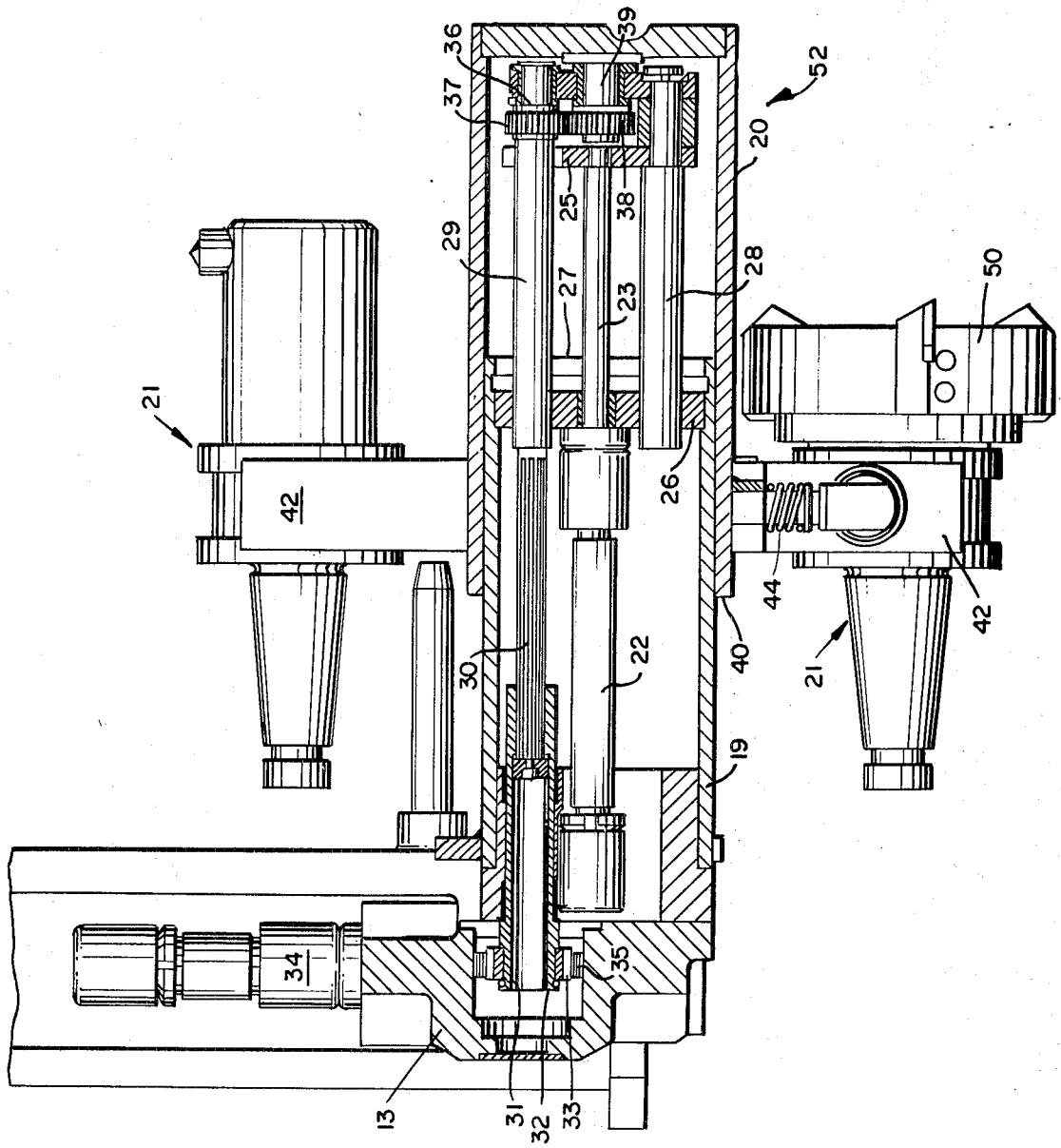
FIG. 4 is a cross-sectional view along the line IV—IV of FIG. 2.

As seen in FIGS. 2 and 3, a cylinder 14 of a first hydraulic piston drive is fixedly connected to the bracket 9. The movable piston rod 15 of this drive is attached with the upper end portion 11a of the ribbed guide 11 (FIG. 3) to move the latter in the vertical direction. Another cylinder 17 of a second hydraulic piston drive is affixed to the upper end portion 11a while the piston rod 18 of the second piston drive is attached to the second slide carriage 13 of the turret head 52 to provide an additional vertical movement of the latter. The telescopic tubular drive assembly for the turret head is seen in cross-section in FIG. 4. A short inner tubular piece 19 is affixed at a right angle to the carriage 13. On the free end of tubular piece 19, an outer short tubular piece 20 is slidably disposed for axial and rotatable motion. The outer tubular piece 20 supports respective spring grippers 21 for manipulation with the tools to be replaced. A cylinder 22 of a third hydraulic piston drive is fixedly mounted within the inner tubular piece 19 where as the piston rod 23 of this third drive is connected by means of a planet gear assembly with an end cross-piece 24 secured to the end of the tubular piece 20. At the center of the cross-piece 24, a bearing bolt 39 is fixedly attached. A cage 25 of a planet gear assembly is journalled on the bearing bolt 39 and secured against rotation with respect to the inner tubular piece 19 by means of guide bolts 28 and 29 which are slidably arranged in the cross-piece 26 of the inner tubular piece 19. Guide bolt 29, which is approximately twice as long as guide bolt 28, is provided on its extended portion with longitudinal grooves 30 which engage corresponding grooves within a hollow shaft 31. Hollow shaft 31 is pivotably secured to the slide carriage 13 and is terminated with a pinion 33. The opposite end of the guide bolt 29 is terminated with a planet gear 37 and pivotably secured to the cage 25. Inside the slide carriage 13, there is arranged a multiposition hydraulic piston drive 34, the piston rod of which has the form of a toothed rack 35 which is in mesh with the pinion 33 to transmit rotational movement thereof by means of the grooved shaft coupling to the planet gear 37. The bearing bolt 39 is terminated with a fixed central gear 38 which is in engagement with the rotatable planet gear 37.

In the region of the rear end 40 of the outer tubular piece 20, there is affixed a cross-shaped gripper support plate 41 (FIG. 2) upon which are swingably mounted spring grippers 21. Each of the spring grippers 21 includes a pair of counteracting jaws 42, as seen in FIG. 2, each having on its outer surface a spring buffer 44 which abuts against corresponding abutment 43 disposed on said plate 41 at an angle of approximately 45° between respective grippers 21. When only two oppositely arranged spring grippers 21 are employed for the gripping device, a thrust spring (not shown) must be provided between the jaws 42.

The mode of operation of the tool replacing device of this invention is as follows:

It is presumed that a subprogram for automatic tool changing process is inserted in the program for the automatic machine tool operation, which controls the following steps provided that at the start of the machine tool operation a tool 50' is installed on the spindle nose 8. Tool 50' is to be replaced by another stored tool 50 (FIG. 1) which is suspended in the recess 51 of the chain element 45'. At this movement the ribbed guide 11 occupies an intermediate position (watching position) between its upper and lower end positions. Subsequently, the slide carriage 13 of the turret head 52 is driven by means of the second piston drive 17 upwardly on the ribbed guide 11 to a level at which the upper gripper 21 is able to grasp the stored tool 50. By the aid of the tracing device 53, the desired position of the chain 45 was adjusted in the course of the previous programming step so that the desired tool is disposed in the point of transfer. Thereby it is advantageous to arrange respective tools upon the chain 45 in a succession corresponding to that of the programmed application of tools in the machine tool operation. It is also possible to arrange the tools in the chain 45 at random. However, in this case it is necessary to provide identification means for respective stored tools and an additional scanning and assorting device.

As soon as the spring gripper 21 has grasped the tool 50, tool 50 is pulled out from the recess 51 in the chain element 45' by a short axial movement of the turret head 52, which movement is produced by means of the third hydraulic drive 22. The turret head 52 is then moved downwardly on the ribbed guide 11 as low as to the lower limit of guide 11. In the meantime, the machine operation employing the tool 50' has finished and the ribbed guide 11 moves downwardly by means of the first drive 14, so that the lower gripper 21' is in position of grasping the tool 50' which is installed on the nose of the working spindle 8. By another short axial movement of the turret head 52 tool 50' is pulled off the spindle 8 and in a further step the turret head 52 is pivoted by the aid of the drive 34 about 180°, the tool 50 is placed in front of the working spindle 8 and installed to position on the spindle by an axial movement of the turret head 52.

The spring gripper 21 is then released from the installed tool 50 by an upward movement of the sliding carriage 13 and, as a next step, the ribbed guide 11 is removed to the intermediate (waiting) position, and the spindlestock 7 is prepared for a new operational step.

The above described tool changing process may be carried out at any position of the slide carrier 5 and column 3. By means of appropriate limit switches (not shown) it is possible to adjust the movements of respective hydraulic piston drives. If a multiple positioning of column 3 is required during the programmed machine tool operation, the hydraulic tracing device 53 will adjust the position of the tool storage chain 45 so that the chain element with the required tool is kept exactly in the point of transfer.

The controlling of the movements of respective grippers 21 is carried out as follows:

The axial movement thereof is accomplished by means of the third hydraulic drive 22 which axially displaces the outer tubular piece 20 on the inner tubular piece 19.

The rotational movement of the outer tubular piece 20 is accomplished by actuating the multiposition hydraulic drive 34 which displaces the toothed bar 35 about the required distance. Consequently, this axial motion is transformed by means of the pinion 33 in a rotational movement of the grooved hollow shaft 31 and mating grooved guide bolt 29, and transmitted to the planet gear 37 which engages the fixedly arranged central gear 38. Since the central gear 38 is fixedly connected with the outer tubular piece 20 and the cage 25 is non-rotatably coupled with the inner tubular piece 19, the rotational movement of the planet gear 37 results in the rotational movement of the outer tubular piece 20.

The positions of the hydraulic drive 34 are preset for controlling either a four-armed or a two-armed gripper assembly. For a cross-shaped gripping turret head 52 it is necessary to exercise two semi-circular movements, whereas for the two-armed turret head four angular movements about 90° are required.

Although schematically shown in connection with machine tools of the above-described type, the invention can be employed in the same manner with machine tools having the spindlestock 7 arranged immediately upon the perpendicular slideway 4 of the machine column 3, whereby the working spindle 8 is supported in a spindle sleeve guide. It is also possible to produce a relative axial movement for the working spindle by displacing the fixture for the workpiece.

It will be understood that the foregoing disclosure relates only to preferred embodiments of the invention which is intended to include all changes and modifications of the examples described within the scope of the invention as set forth in the appended claims.

What is claimed is:

1. A tool changing device for a machine tool having a working spindle adapted for receiving a replaceable tool, first support means, said working spindle being slidably mounted on the first support means for movement in a first coordinate axis, second support means, said first support means being slidably mounted on said second support means for movement in a second coordinate axis, and third support means, said second support means being slidably mounted on said third support means for movement in a third coordinate axis, comprising a tool-storing-and-conveying member; means for guiding a portion of said tool-storing-and-conveying member operatively mounted near to a top portion of said second support means, tool transfer means including gripping means for manipulating said tool on said storing-and-conveying member and said working spindle, guiding means attached to first support means for guiding said tool transferring means on the line between said tool-storing-and-conveying member and said working spindle, and drive means operatively coupled to said guiding means and said tool transfer means for selectively driving respective functional elements of said tool transfer means.

2. The tool changing device according to claim 1 wherein said tool-storing-and-conveying member comprises a chain including chain elements respectively supporting the tools to be replaced, chain drive means, and a chain position control unit mounted on said second support means for controlling the position of said chain according to position changes of said working spindle in said third coordinate axis.

3. The tool changing device according to claim 2 wherein said guiding means comprises a bracket attached to said first support means and having a perpendicular guideway on the side facing said line, a telescopic ribbed guide slidably supported on said perpendicular guideway, and said tool transfer means further including a slide carriage slidably supported on said ribbed guide and carrying said gripping means.

4. The tool replacing device according to claim 3 wherein said drive means comprises a first piston drive jointed between said telescopic ribbed guide and said first support means, and a second piston drive jointed between said telescopic ribbed guide and said slide carriage.

5. The tool replacing device according to claim 4 wherein said gripping means comprises: a telescopic tubular slide member comprising an inner tubular piece attached at one end to said slide carriage and of an outer tubular piece slidably and rotatably enclosing the free end of said inner tubular piece; a plurality of spring grippers arranged circumferentially on said outer tubular piece to form a plurality of arms for manipulating said tools, a planetary gear assembly including a central gear fixedly mounted on a bearing bolt which is integral with the front end of said outer tubular piece, a cage pivotably supported on said bearing bolt and secured against rotation with respect to said inner tubular piece; a planet gear pivotably supported on said cage and being in engagement with said central gear; a grooved shaft integral at one end with said planet gear and at the other end being in engagement with a grooved hollow shaft, said hollow shaft being pivotably secured to said slide carriage and terminated with a pinion, a third piston drive disposed within said slide carriage and being in engagement with said pinion for transmitting rotational motion to said planet gear and thereby to said outer tubular piece, and a fourth piston drive disposed within said telescopic tubular member and jointed between said inner and outer tubular piece to produce an axial movement of said outer tubular piece.

6. The tool replacing device according to claim 5 wherein each of said spring grippers comprises a pair of swingable gripping jaws, each of said jaws being provided with a spring on its upper surface which spring abuts a buffer disposed on said outer tubular piece between respective grippers at an angle of approximately 45°.

7. The tool replacing device according to claim 6 wherein said gripping means comprises a pivotable cross-shaped four-armed lever.

8. The tool replacing device according to claim 2 wherein said position control unit is a tracing device having a tracing element in contact with respective chain elements and being operatively coupled with drive means of said tool storage chain.

9. The tool replacing device according to claim 8 further comprising a hydraulic tracing device the tracing element of which controls a distributing square slide valve.

10. The tool replacing device according to claim 9 wherein said tracing element is swingably arranged with respect to said chain and controlled by an electromagnet for disengaging from its working position.

References Cited
UNITED STATES PATENTS

| | | | |
|---|---|---|---|
| 3,286,344 | 11/1966 | Brainard et al. | 29—568 |
| 3,277,568 | 10/1966 | Wetzel | 29—568 |

FRANCIS S. HUSAR, Primary Examiner